US010662640B2

(12) United States Patent
Huang

(10) Patent No.: US 10,662,640 B2
(45) Date of Patent: May 26, 2020

(54) CEMENT BOARD

(71) Applicant: USUN (FOSHAN) TECHNOLOGY CO., LTD., Foshan (CN)

(72) Inventor: Chiu-Fong Huang, New Taipei (TW)

(73) Assignee: USUN (FUSHAN) TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 16/229,331

(22) Filed: Dec. 21, 2018

(65) Prior Publication Data

US 2019/0360192 A1 Nov. 28, 2019

(30) Foreign Application Priority Data

May 23, 2018 (CN) ...................... 2018 2 0780041 U

(51) Int. Cl.
| | |
|---|---|
| *E04B 1/38* | (2006.01) |
| *F16B 5/00* | (2006.01) |
| *E04C 5/01* | (2006.01) |
| *E04C 5/16* | (2006.01) |
| *E04B 2/72* | (2006.01) |
| *E04C 2/06* | (2006.01) |
| *E04C 2/30* | (2006.01) |

(52) U.S. Cl.
CPC ............. *E04B 1/38* (2013.01); *E04B 2/721* (2013.01); *E04C 2/06* (2013.01); *E04C 2/30* (2013.01); *E04C 5/01* (2013.01); *E04C 5/16* (2013.01); *F16B 5/00* (2013.01); *E04B 2103/02* (2013.01)

(58) Field of Classification Search
CPC ........ E04B 1/38; E04B 2/721; E04B 2103/02; E04B 5/32; F16B 5/00; E04C 2/06; E04C 2002/001; E04C 2/04; E04C 2/044; E04C 2/30; E04C 2/40; E04C 5/00; E04C 5/01; E04C 5/16

See application file for complete search history.

(56) References Cited

U.S. PATENT DOCUMENTS 2,365,550 A * 12/1944 Heltzel .................. E01C 11/12
404/59
3,611,665 A * 10/1971 O'Brien .................. E04C 3/26
52/649.2

(Continued)

FOREIGN PATENT DOCUMENTS

| DE | 19543768 A1 * | 5/1997 | ........... E04B 1/0038 |
| DE | 102016220433 A1 * | 3/2018 | ............... F16B 5/00 |
| GB | 289131 A * | 4/1928 | ............... B44C 1/18 |

*Primary Examiner* — Jessie T Fonseca
(74) *Attorney, Agent, or Firm* — ScienBiziP, P.C.

(57) ABSTRACT

A cement board made to rapidly and accurately match with a base body. The base body has at least one short and tapered projection extending outward. The cement board includes a concrete slab, a reinforcing frame, and at least one fixing member. The at least one fixing member has at least one positioning hole and at least fixing hole defined thereon. The reinforcing frame is positioned into the concrete slab. The at least one positioning hole is coupled to the at least one projection, to position the cement board onto the base body. The at least one fixing member is coupled to the at least one fixing hole, to fixing the cement board onto the base body. The positioning hole is a tapered hole, a diameter of the positioning hole gradually reduces from one end adjacent to the base body to the other end.

10 Claims, 3 Drawing Sheets

(56) References Cited

U.S. PATENT DOCUMENTS

| | | | | |
|---|---|---|---|---|
| 3,691,710 | A | * | 9/1972 | Gilbert ...................... E04C 2/06 52/251 |
| 2013/0343810 | A1 | * | 12/2013 | Summers .................. F16B 5/00 403/292 |
| 2014/0308079 | A1 | * | 10/2014 | Hamrick ................... E04C 2/06 405/153 |
| 2015/0013240 | A1 | * | 1/2015 | Malakauskas ...... E04B 1/34869 52/79.9 |
| 2015/0027076 | A1 | * | 1/2015 | Pimentel ............... E04C 5/0645 52/396.02 |
| 2015/0052842 | A1 | * | 2/2015 | Shaw ....................... E04C 2/06 52/600 |
| 2019/0284803 | A1 | * | 9/2019 | Recker .................... E01C 23/10 |

* cited by examiner

CEMENT BOARD

FIELD

The subject matter herein generally relates to building field, and particularly relates to a cement board.

BACKGROUND

Prefabricated and partially-prefabricated cements are widely applied in building construction. However, the prefabricated and partially-prefabricated cements are pre-manufactured in factories and then transported to the site for installation by hoisting. During hoisting, the cement's position is adjusted to be coupled with a base. However, because of inaccuracy of artificial adjustment, the cement may not completely match with the base.

Therefore, there is room for improvement within the art.

BRIEF DESCRIPTION OF THE DRAWINGS

Implementations of the present technology will now be described, by way of example only, with reference to the attached figures.

DETAILED DESCRIPTION

Figure 1:
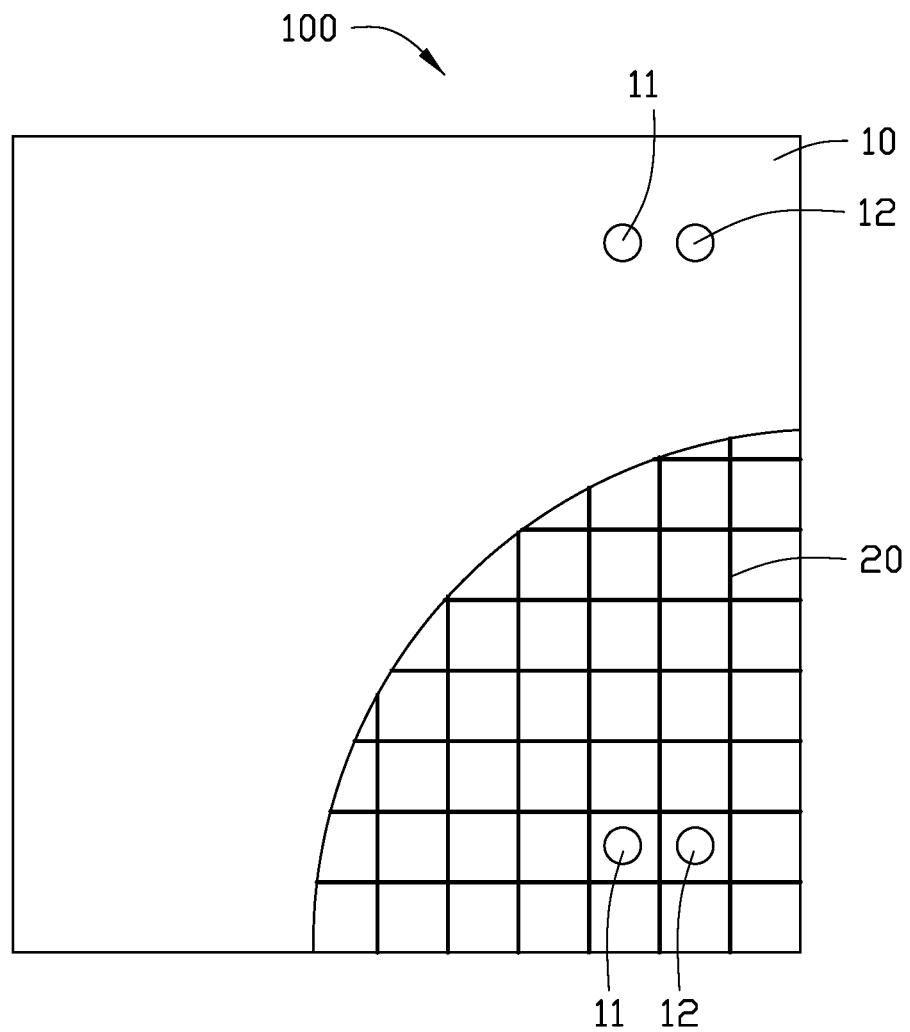
FIG. 1 is a top view of a first embodiment of a cement board with partly exploded.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
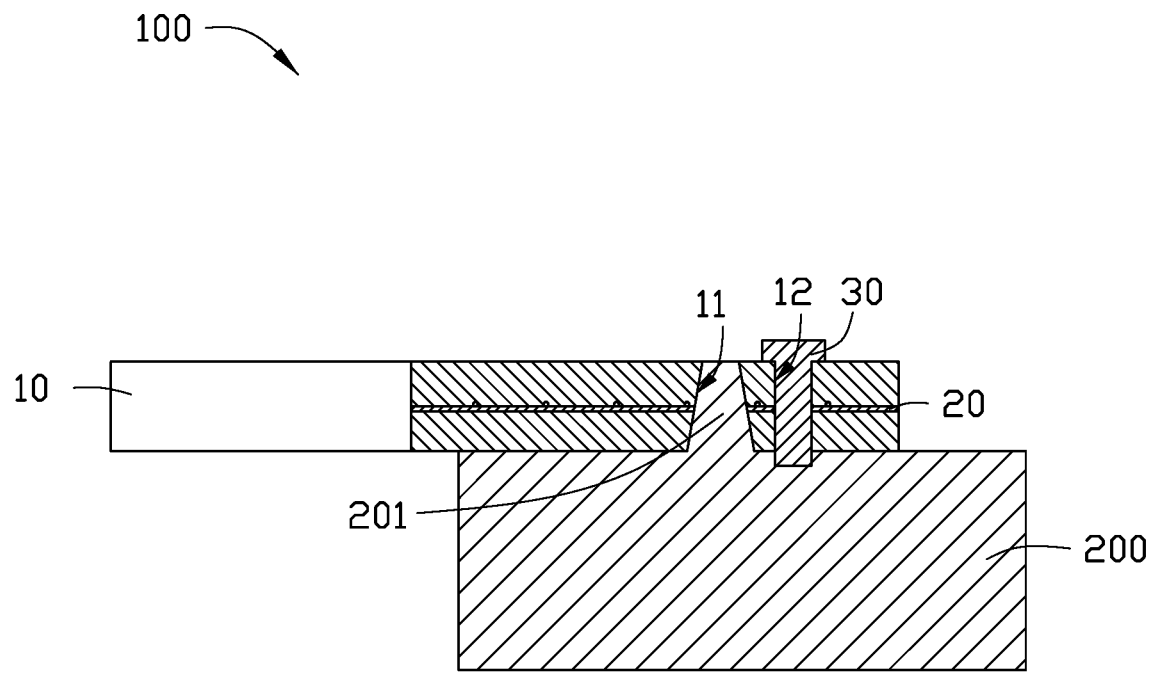
FIG. 2 is a lateral view of the cement board in FIG. 1.

FIG. 1 and FIG. 2 show a cement board 100 of a first embodiment of the disclosure rapidly and accurately matching with a base body 200. The base body 200 may be a wall, a roadbed, or any structural foundation, and so on. In this embodiment, the base body 200 is a wall. The cement board 100 may be a prefabricated and partially-prefabricated cement board. The cement board 100 includes a concrete slab 10 and a reinforcing frame 20 positioned inside the concrete slab 10.

The concrete slab 10 is poured from concrete. The concrete slab 10 may have different lengths and widths, and may be made of different cementing materials, according to actual needs.

At least one positioning hole 11 is pre-defined in the concrete slab 10. The at least one positioning hole 11 is located adjacent to an edge of the concrete slab 10. The at least one positioning hole 11 is for positioning the cement board 100 onto the base body 200. Specifically, the base body 200 has at least one projection 201 coupling to the at least one positioning hole 11. The at least one projection 201 is formed on and extends outwards from the base body 200. The at least one projection 201 is configured to be inserted into one of the at least one positioning holes 11, to position the concrete slab 100 onto the base body 200. During the positioning process, the concrete slab 100 is hoisted, and then moved relative to the base body 200 until the at least one projection 201 aligns with the at least one positioning hole 11, and then the concrete slab 100 is lowered until the at least one projection 201 is inserted into the at least one positioning hole 11, so that the concrete slab 100 is accurately positioned on the base body 200. In this embodiment, the concrete slab 100 has two positioning holes 11 defined thereon.

The positioning hole 11 may be a tapered hole. A diameter of the positioning hole 11 gradually reduces from one end adjacent to the base body 200 to the other end.

In this embodiment, the positioning hole 11 is substantially frustum-shaped. The projection 201 is a corresponding frustum-shape. In other embodiments, the positioning hole 11 may have other shapes, and the projection 201 has a shape matching with the positioning hole 11. In this embodiment, the positioning hole 11 is a through hole that runs through the concrete slab 10. In other embodiments, the positioning hole 11 may be a blind hole recessed from a side surface of the concrete slab 10.

The concrete slab 10 further includes at least one fixing hole 12 defined therein. The at least one fixing hole 12 is adjacent to and spaced from the positioning hole 11. The concrete slab 100 further includes at least one fixing member 30. The at least one fixing member 30 is provided to match with the at least one fixing hole 12 to fix and lock the concrete slab 100 onto the base body 200 after the concrete slab 100 is positioned. In other embodiments, the fixing hole 12 and the fixing member 30 may be omitted, and the concrete slab 100 may be fixed onto the base body 200 via pouring.

The reinforcing frame 20 is a net structure composed of two-way reinforcings. The two-way reinforcements are welded or bound crosswise.

Figure 3:
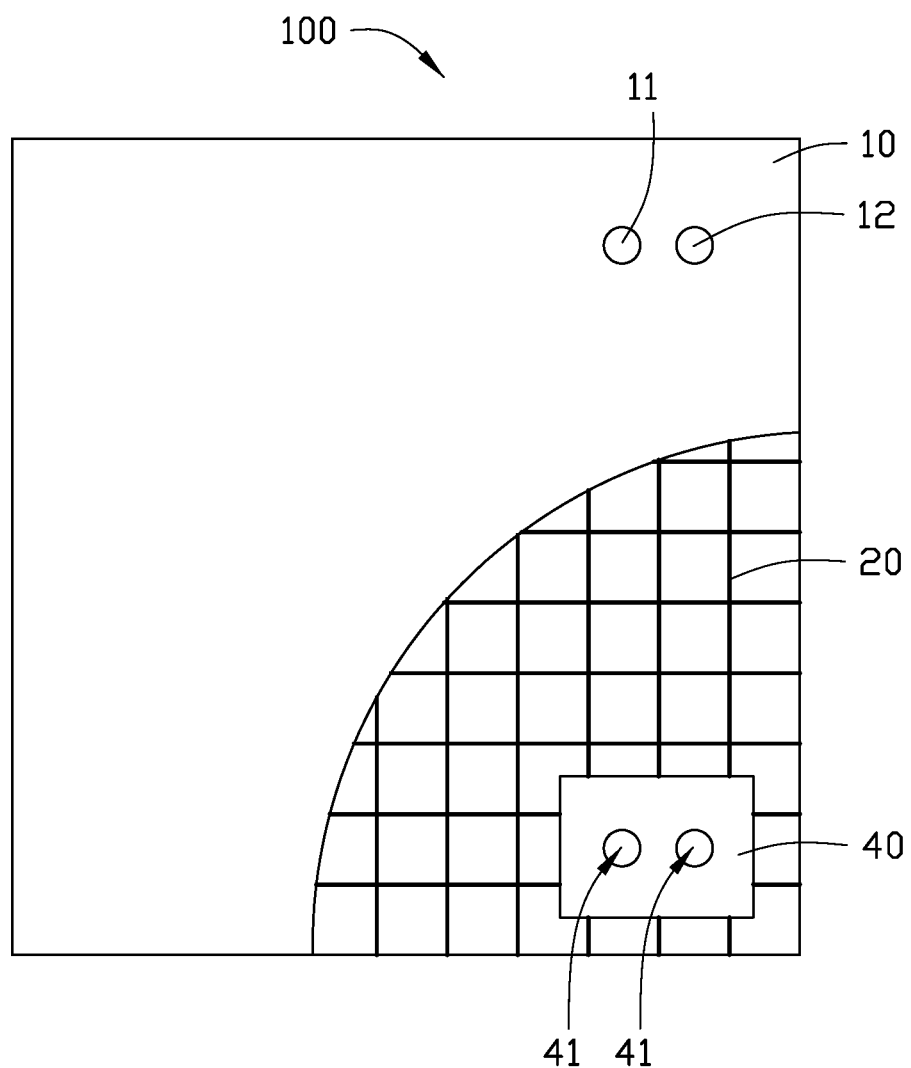
FIG. 3 is a top view of a second embodiment of a cement board with partly exploded.

Referring to FIG. 3, the cement board 100 of a second embodiment of the disclosure has a structure similar to that of the cement board 100 of the first embodiment, difference being that the cement board 100 of the second embodiment further includes a panel 40.

The panel 40 is positioned inside the concrete slab 10 and is welded to the reinforcing frame 20. The panel 40 includes a pre-formed positioning hole 41 and a pre-formed fixing hole 42 defined therein. The pre-formed positioning hole 41 faces the positioning hole 11 of the concrete slab 10, and the pre-formed fixing hole 42 faces the fixing hole 12 of the concrete slab 10. During positioning process, the projection 201 of the base body 200 is inserted into the positioning hole 11 and the pre-formed positioning hole 41; and during fixing process, the fixing member 30 is inserted into the fixing hole 12 and the pre-formed fixing hole 42.

The concrete slab 100 of the disclosure has at least one positioning hole 11 defined in the concrete slab 10, and the base body 200 has at least one corresponding projection 201 to couple with the at least one positioning hole 11, so that the concrete slab 100 can be positioned to the base body 200 quickly and accurately.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A cement board, for matching with a corresponding base body with at least one projection extending outward, the cement board comprising:
    a concrete slab having at least one positioning hole and at least fixing hole defined thereon;
    a reinforcing frame positioned inside the concrete slab; and
    at least one fixing member;
    a panel positioned inside the concrete slab, the panel is welded onto the reinforcing frame;
    wherein the at least one positioning hole is coupled to the at least one projection, to position the cement board onto the base body; the at least one fixing member is coupled to at least one fixing hole, to fixing the cement board onto the base body; and the positioning hole is a tapered hole, a diameter of the positioning hole gradually reduces from one end adjacent to the base body to the other end;
    a pre-formed positioning hole and a pre-formed fixing hole are defined on the panel; the pre-formed positioning hole faces one of the at least one positioning hole of the concrete slab, and the pre-formed fixing hole faces one of the at least one fixing hole of the concrete slab; during positioning process, the at least one projection is inserted into the one of the at least one fixing hole and the pre-formed positioning hole, and during fixing process, the at least one fixing member is inserted into the one of the at least one fixing hole and the pre-formed fixing hole.

2. The cement board of claim 1, wherein the at least one positioning hole is a frustum-shape, and the at least one projection is corresponding frustum-shaped.

3. The cement board of claim 1, wherein at least one positioning hole is a through hole.

4. The cement board of claim 1, wherein the concrete slab is poured from concrete.

5. The cement board of claim 1, wherein the reinforcing frame is a net structure composed of two-way reinforcements, the two-way reinforcements are welded or bound crosswise.

6. The cement board of claim 1, wherein the at least one positioning hole is located adjacent to an edge of the concrete slab, and the at least one fixing hole is adjacent to and spaced from the at least one positioning hole.

7. A cement board, for matching with a corresponding base body with at least one projection extending outward, the cement board comprising:
    a concrete slab having at least one positioning hole and at least fixing hole defined thereon;
    a reinforcing frame positioned inside the concrete slab; and
    a panel positioned inside the concrete slab, the panel is welded onto the reinforcing frame;
    wherein the at least one positioning hole is coupled to the at least one projection, to position the cement board onto the base body; and the positioning hole is a tapered hole, a diameter of the positioning hole gradually reduces from one end adjacent to the base body to the other end;
    a pre-formed positioning hole and a pre-formed fixing hole are defined on the panel; the pre-formed positioning hole faces one of the at least one positioning hole of the concrete slab, and the pre-formed fixing hole faces one of the at least one fixing hole of the concrete slab; during positioning process, the at least one projection is inserted into the one of the at least one fixing hole and the pre-formed positioning hole.

8. The cement board of claim 7, further comprising at least one fixing member, wherein the at least one fixing member is coupled to the at least one fixing hole, to fixing the cement board onto the base body, and during fixing process, the at least one fixing member is inserted into the one of the at least one fixing hole and the pre-formed fixing hole.

9. The cement board of claim 7, wherein the at least one positioning hole is a frustum-shape, and the at least one projection is corresponding frustum-shaped.

10. The cement board of claim 7, wherein the at least one positioning hole is a through hole.

* * * * *

UNITED STATES PATENT AND TRADEMARK OFFICE
CERTIFICATE OF CORRECTION

PATENT NO. : 10,662,640 B2  
APPLICATION NO. : 16/229331  
DATED : May 26, 2020  
INVENTOR(S) : Chiu-Fong Huang Page 1 of 1

It is certified that error appears in the above-identified patent and that said Letters Patent is hereby corrected as shown below:

On the Title Page

Please replace Item (73) regarding "Assignee" with the following:  
(73) USUN (FOSHAN) TECHNOLOGY CO., LTD., Foshan (CN)

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*